(12) United States Patent
Kopiness

(10) Patent No.: US 9,344,027 B2
(45) Date of Patent: May 17, 2016

(54) MOTOR DRIVE ADD-ON PRE-CHARGE CAPACITIVE MODULE AND METHOD

(75) Inventor: Jeremiah John Kopiness, Saukville, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1016 days.

(21) Appl. No.: 13/490,132

(22) Filed: Jun. 6, 2012

(65) Prior Publication Data

US 2013/0328515 A1    Dec. 12, 2013

(51) Int. Cl.
| | |
|---|---|
| *H02P 1/00* | (2006.01) |
| *H02P 3/00* | (2006.01) |
| *H02P 5/00* | (2006.01) |
| *H02P 7/00* | (2006.01) |
| *H02P 23/00* | (2016.01) |
| *A63H 17/32* | (2006.01) |
| *F16P 3/12* | (2006.01) |
| *A63H 17/34* | (2006.01) |
| *H01J 17/06* | (2006.01) |
| *A63H 19/14* | (2006.01) |
| *H02M 7/06* | (2006.01) |

(52) U.S. Cl.
CPC ............ *H02P 23/0081* (2013.01); *A63H 17/32* (2013.01); *A63H 17/34* (2013.01); *A63H 19/14* (2013.01); *F16P 3/12* (2013.01); *H01J 17/063* (2013.01); *H02M 7/062* (2013.01)

(58) Field of Classification Search
CPC ....... A63H 17/32; A63H 17/34; A63H 19/14; F16P 3/12; H01J 17/063
USPC .......................................... 318/558
See application file for complete search history.

(56) References Cited

U.S. PATENT DOCUMENTS

| | | | | |
|---|---|---|---|---|
| 2004/0095784 A1* | 5/2004 | Zhou | ...................... | H02M 5/458 363/37 |
| 2010/0080022 A1* | 4/2010 | Schmidt | ................ | H02M 7/062 363/53 |

* cited by examiner

*Primary Examiner* — Kawing Chan
*Assistant Examiner* — Bradley Brown
(74) *Attorney, Agent, or Firm* — Fletcher Yoder P.C.

(57) ABSTRACT

A method for pre-charging a motor drive system includes: pre-charging a motor drive through a motor DC bus where desired, pre-charging an add-on capacitive module through a resistor after a time delay, pre-charging the add-on capacitive module and bypassing the resistor, and disconnecting the add-on capacitive module from the motor DC bus when a fault condition has been detected.

18 Claims, 4 Drawing Sheets

MOTOR DRIVE ADD-ON PRE-CHARGE CAPACITIVE MODULE AND METHOD

BACKGROUND

The invention relates generally to motor drive systems, and more specifically, to systems and methods to pre-charge the motor drive systems.

In the field of power electronic devices, a wide range of circuitry is known and currently available for converting, producing and applying power to loads. Depending on the application, such circuitry may convert incoming power from one form to another as needed by the load. In a typical motor control application, for example, a rectifier converts alternating current (AC) power (such as from a utility grid or generator) to direct current (DC) power. Inverter circuitry can then convert the DC signal into an AC signal of a particular frequency desired for driving a motor at a particular speed. The inverter circuitry typically includes solid state power electronic switches, such as insulated-gate bipolar transistors (IGBTs), controlled by drive circuitry. Often, power conditioning circuits, such as capacitors and/or inductors, are employed to remove unwanted voltage ripple on the internal DC bus.

Often, at the first application of AC power to the motor drive circuit detailed above, the circuit will draw high levels of current due to the charging of the power conditioning capacitors. To avoid a high in-rush current at start-up, a typical motor drive may also include a pre-charge circuit, which applies a smaller initial current to the DC bus just prior to start-up to charge the capacitors. The number and rating of the capacitors may be selected based upon expected loading (e.g., via motion profiles, system load analysis, etc.), to provide for and to reduce variability in the bus voltage during operation. Once selected, the capacitance of the power conditioning capacitors is relatively constant, even though the power demand of the motor drive may not be constant over time. In addition, changing the capacitance of the power conditioning capacitors may involve manually removing and replacing portions of the pre-charge circuit, which may be time-consuming and generally inefficient.

BRIEF DESCRIPTION

The embodiments described herein enable discrete changes to the total capacitance of pre-charge circuits, thereby increasing the flexibility and operability of motor drive systems. In particular, one or more add-on capacitive modules may be connected to a DC bus of a motor drive system to increase the capacitance of the motor drive system. Each add-on capacitive module includes sensors, switches, and a resistor element, as will be described in further detail below. In addition, the add-on capacitive module also includes circuitry that protects the motor drive system by disconnecting the add-on module from the DC bus if a fault is detected.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure is directed to an add-on capacitive module that enables discrete changes to the total capacitance of a motor drive system. To this end, the add-on module includes a capacitive circuit and control circuitry configured to control pre-charge of the capacitive circuit, and to protect the add-on module and/or the motor drive system. As noted earlier, the capacitance of existing motor drive systems may be relatively constant. However, the add-on capacitive module presently contemplated may be retroactively fit into existing motor drive systems, or installed at the time of drive commissioning, thereby increasing the efficiency and operability of existing motor drive systems.

Figure 1:
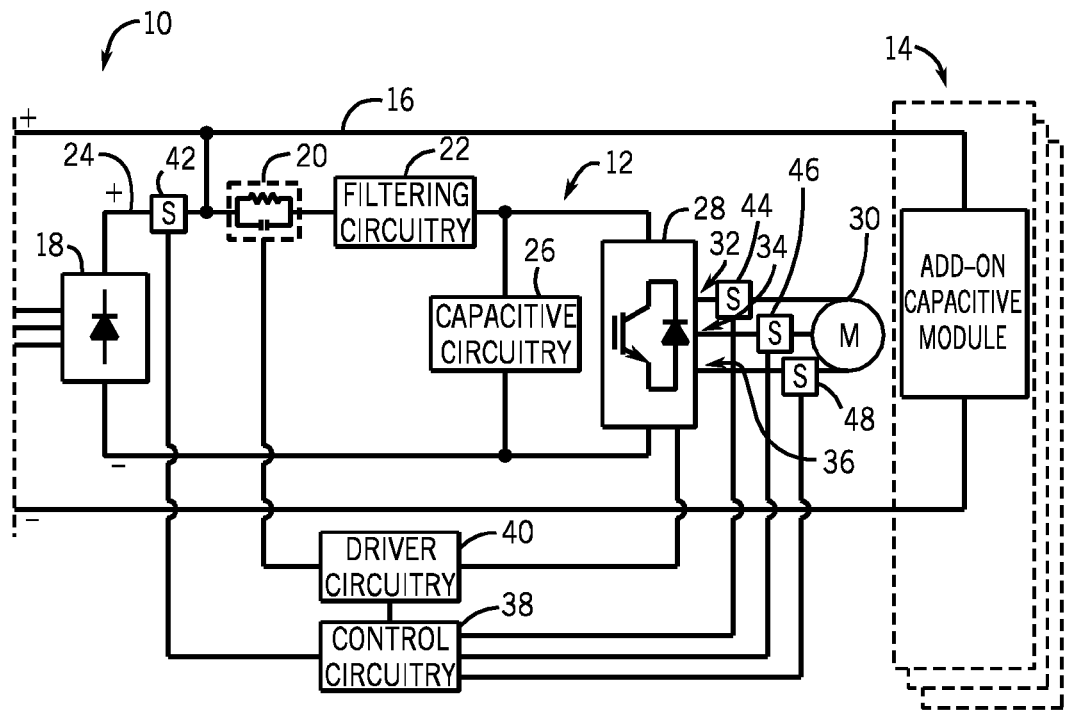
FIG. 1 is a circuit diagram of an embodiment of a motor drive system including one or more add-on capacitive modules to improve the operability of the system.

Turning now to the figures, FIG. 1 illustrates an exemplary motor drive system 10. The motor drive system 10 includes a motor drive 12 and an add-on capacitive module 14. Both the motor drive 12 and the add-on capacitive module 14 are coupled to, and draw power from, a main DC bus 16. As shown, the motor drive 12 and the add-on capacitive module 14 share the main DC bus 16 (e.g., a shared DC configuration). In certain embodiments, the motor drive 12 and the add-on capacitive module 14 may be connected to separate DC buses. The main DC bus 16 may be powered by various sources, such as a rectified AC source.

The motor drive 12 includes a rectifier 18, pre-charge circuitry 20 (e.g., motor drive pre-charge circuitry), and filtering circuitry 22 (e.g., power conditioning circuitry). The rectifier 18 receives 3-phase AC power from a power source (not shown) and outputs DC power. Accordingly, the rectifier 18 provides the motor drive 12 with greater versatility by allowing the option for coupling the motor drive 12 to an AC source, if desired. It should be noted that the AC source may provide single or multiple phase power, and the rectifier circuitry may be passive or active (e.g., switched). A motor DC bus 24 is disposed at the output of the rectifier 18 and provides power to downstream elements of the motor drive 12, including the pre-charge circuitry 20. The switch of the pre-charge circuitry 20 may be normally open, thereby dampening the current to the filtering circuitry 22. When the switch closes, power may freely flow to downstream elements of the motor drive 12, such as the filtering circuitry 22. The filtering circuitry 22 may condition the power from the rectifier 18 to reduce emissions or harmonic distortions of the motor drive system 10. In certain embodiments, the pre-charge circuitry 20 may also include a resistor to reduce the effects of in-rush current when power is initially applied to the motor DC bus 24.

As illustrated, the motor drive 12 also includes capacitive circuitry 26 and an inverter 28, which are coupled to the rectifier 18 via the motor DC bus 24. The capacitive circuitry 26 extends across the motor DC bus 24 and includes one or more capacitors (not separately shown) to store charge. The size and number of capacitors may be fixed, such that the capacitive circuitry 26 may have a relatively constant total capacitance. However, the addition of one or more add-on capacitive modules 14 may enable changes to the total capacitance of the motor drive system 10. The capacitive circuitry 26 may improve the steady-state operation of the motor drive system 10 by absorbing energy as the load coupled to the motor drive 12 decelerates and returning energy as the load accelerates.

The inverter 28 generates a 3-phase output waveform at a desired frequency for driving a motor 30 connected to the output terminals 32, 34, 36. It should be noted that the circuitry could be designed for single phase operation. The output waveform from the inverter 28 may be controlled by control circuitry 38 and driver circuitry 40. As shown, the control circuitry receives inputs from current sensors 44, 46, 48. The current sensor 42 is disposed on the motor DC bus 24 and is configured to detect an input current into the pre-charge circuitry 20. The sensors 42, 44, 46, 48 are coupled to the output terminals 32, 34, 36 of the inverter 28, and are configured to detect an output current to the motor 30. In order to control the speed of the motor 30, the control circuitry 38 may direct the driver circuitry 40 to control the conductive states of solid state switches (e.g., IGBT's) of the inverter 28. In most applications, depending upon the nature of the motor being driven, the motor speed will be a function of the frequency of the waveform output by the inverter. It should be noted, however, that various control regimes may be implemented, such as manual or automatic speed regulation, closed-loop torque control, and so forth. In certain embodiments, the control circuitry 38 and driver circuitry 40 may automatically adjust the inverter 28 in response to a change in the input current detected by the sensor 42, in order to maintain steady-state operation of the motor 30. In addition, the sensors 42, 44, 46, 48 may sense various parameters, such as voltages, temperatures, currents, or a combination thereof.

Figure 2:
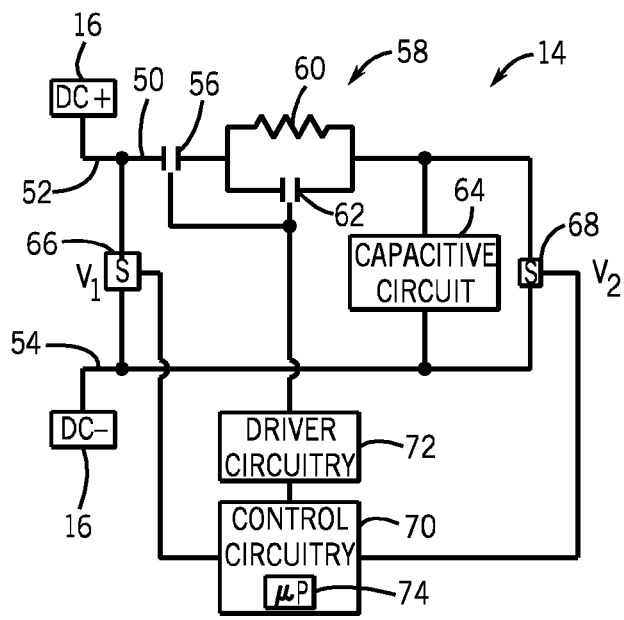
FIG. 2 is a circuit diagram of an embodiment of the add-on capacitive module of FIG. 1 in accordance with aspects of the present techniques.

FIG. 2 is a circuit diagram illustrating the components of the add-on capacitive module 14 of FIG. 1. As shown, the add-on capacitive module 14 includes a module DC bus 50 that is coupled to the main DC bus 16. Thus, the module DC bus 50 may also be coupled to the motor DC bus 24. The module DC bus 50 includes a positive leg 52 and a negative leg 54. An isolation switch 56 is coupled to the positive leg 52 of the module DC bus 50. The isolation switch 56 may be any solid-state or electromechanical switch, such as a relay, a contactor, an IGBT, or a silicon-controlled rectifier (SCR). As illustrated, the isolation switch 56 is normally open. The isolation switch 56 serves to isolate the add-on capacitive module 14 from the main DC bus 16 and/or motor DC bus 24. For example, it may be desirable to disconnect the add-on capacitive module 14 when a fault has been detected. In addition, pre-charging the motor drive 12 prior to pre-charging the add-on capacitive module 14 may reduce the stress on the rectifier 18 and/or enable an increased number of add-on capacitive modules 14 within the motor drive system 10.

The add-on capacitive module 14 also includes pre-charge circuitry 58, which is disposed in the positive leg 52 of the module DC bus 50. The pre-charge circuitry 58 is connected in series with the isolation switch 56. Although the pre-charge circuitry 58 is illustrated as downstream of the isolation switch 56, in certain embodiments, the pre-charge circuitry 58 may be disposed upstream of the isolation switch 56. The pre-charge circuitry 58 includes a pre-charge resistor 60 and a resistor bypass switch 62 arranged in parallel. The resistor bypass switch 62 may also be any solid-state or electromechanical switch, as discussed above. As will be appreciated by those skilled in the art, the pre-charge resistor 60 may reduce the effects of in-rush current when charging a capacitive circuit 64 of the add-on capacitive module. For example, when the isolation switch 56 closes, power may flow through the pre-charge resistor 60 and then through the capacitive circuit 64. After a time delay or depending upon the state of charge, the resistor bypass switch 62 may close, enabling power to bypass the pre-charge resistor 60 to the capacitive circuit 64. As noted previously, reducing the effects of in-rush current may generally improve the operability of the add-on capacitive module 14.

The capacitive circuit 64 is disposed across the positive leg 52 and the negative leg 54 of the module DC bus 50. Similar to the capacitive circuitry 26 of FIG. 1, the capacitive circuit 64 includes one or more capacitors (not shown) that are configured to store energy when pre-charged. As illustrated, the add-on capacitive module 14 also includes an input voltage sensing circuit 66 and a module voltage sensing circuit 68. The input voltage sensing circuit 66 is configured to detect a voltage $V_1$ across the positive leg 52 and the negative leg 54 of the module DC bus 50. The voltage $V_1$ is indicative of a state-of-charge of the capacitive circuitry 26 of the upstream motor drives 12. Indeed, when the isolation switch 56 is open, the input voltage sensing circuit 66 may detect the voltage across the main DC bus 16. As the capacitive circuitry 26 of the upstream motor drives 12 charges, the voltage $V_1$ detected by the sensing circuit 66 may increase. Similarly, the module voltage sensing circuit 68 is configured to detect a voltage $V_2$ across the positive leg 52 and the negative leg 54 of the module DC bus 50. The voltage $V_2$ is indicative of a state-of-charge of the capacitive circuit 64. For example, as the capacitive circuit 64 charges, the voltage $V_2$ may increase. The voltage sensing circuits 66, 68 may communicate voltage information to control circuitry 70, which may control pre-charging of the add-on capacitive module 14. In certain embodiments, the control circuitry 70 may control pre-charging based on various parameters, such as voltages, temperatures, currents, or a combination thereof.

The control circuitry 70 is coupled to the voltage sensing circuits 66, 68, and driver circuitry 72. The driver circuitry 72 is configured to open or close the isolation switch 56 and/or the resistor bypass switch 62 based on signals from the control circuitry 70. Accordingly, the control circuitry 70 may include a processor 74 (e.g., processing circuitry) in order to process the voltage information from the sensing circuits 66, 68 to control pre-charging of the add-on capacitive module 14. For example, the isolation switch 56 and the resistor bypass switch 62 may be normally open, thereby isolating the add-on capacitive module 14 from the remainder of the motor drive system 10. Once the voltage $V_1$ reaches a predetermined threshold (e.g., the upstream motor drives 12 have become sufficiently charged), the control circuitry 70 may close the isolation switch 56. Because the resistor bypass switch 62 is still open, power may flow through the isolation switch 56, through the pre-charge resistor 60, and finally to the capacitive circuit 64. Similarly, once the voltage $V_2$ reaches a predetermined threshold (e.g., the add-on capacitive module has become sufficiently charged), the control circuitry 70 may close the resistor bypass switch 62. Thus, power may then flow through the isolation switch 56, through the resistor bypass switch 62, and to the capacitive circuit 64. In the aforementioned embodiment, the upstream motor drive 12 is pre-charged before the add-on capacitive module 14 is pre-charged. However, in certain embodiments, it may be desirable to pre-charge the add-on capacitive module first, or to pre-charge both simultaneously.

In addition, it may be desirable to isolate the add-on capacitive module 14 from the motor drive system 10 in the event of a fault condition. For example, the control circuitry 70 may detect an over-voltage of the drive motor 12 and open the isolation switch 56 in response. Additionally or alternatively, the control circuitry 70 may detect an over-voltage of the add-on capacitive module 14 and open the isolation switch 56 to protect the motor drive system 10. Thus, isolating the add-on capacitive module 14 may involve opening the isolation switch 56. The control circuitry 70 may detect a fault condition based on the voltage information from the voltage sensing circuits 66, 68. As noted above, the control circuitry 70 may control pre-charging based on various parameters (e.g., temperature and voltage, among others). Accordingly, the fault condition may be an over-temperature, an over-voltage, an open fuse, a voltage sense imbalance, another pre-charge fault, or a combination thereof.

Figure 3:
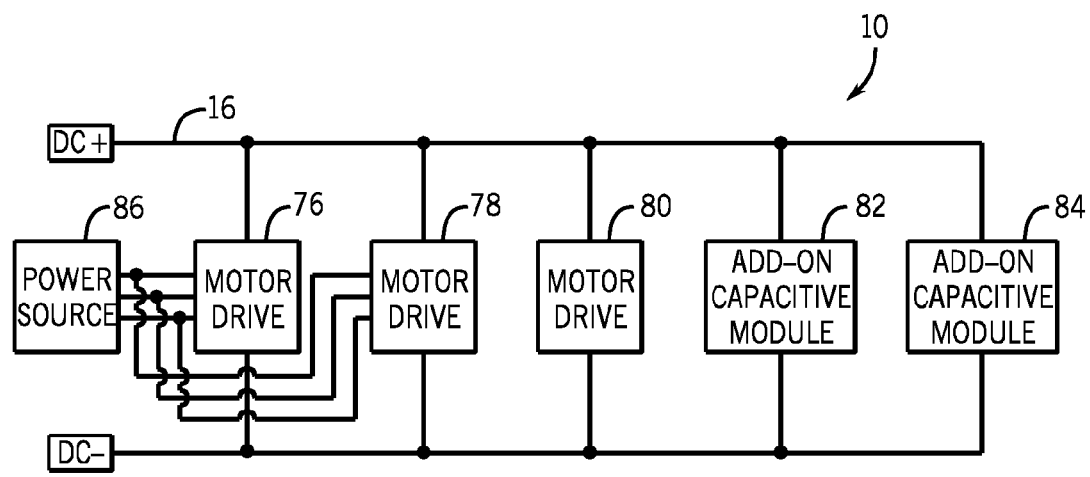
FIG. 3 is a schematic diagram of an embodiment of a motor drive system, illustrating multiple motor drives and multiple add-on capacitive modules connected to a shared DC bus.

FIG. 3 is a schematic diagram of the motor drive system 10, illustrating multiple motor drives 12 and multiple add-on capacitive modules 14 connected to the main DC bus 16 in a shared DC bus configuration. The multiple motor drives 12 and multiple add-on capacitive modules 14 are connected in parallel. As illustrated, the motor drive system 10 includes three motor drives 76, 78, 80 and two add-on capacitive modules 82, 84. It should be noted that the motor drive system 10 may employ any number of motor drives and/or add-on capacitive modules, depending on the anticipated motion profile or other factors. That is, the motor drive system may include 1, 2, 3, 4, 5, or more motor drives 12 and/or 1, 2, 3, 4, 5, or more add-on capacitive modules 14. For clarity, the respective motors and control circuitry of each motor drive 12 and each add-on capacitive module 14 have been omitted. An AC power source 86 provides power to the motor drives 76, 78 in a shared AC configuration. The motor drive 80 receives power from a separate power source (not shown). Thus, the motor drive system 10 may be powered from one or more separate power sources.

As may be appreciated, the add-on capacitive modules 14 may be produced in standard sizes (e.g., 10 μF, 100 μF, 1000 μF, and the like). Multiple add-on capacitive modules may be combined in parallel to achieve a desired total capacitance. In certain embodiments, the desired total capacitance may be based on a size and/or number of motor drives 12. For example, it may be desirable to provide a higher capacitance for larger motor drives. In addition, certain software, such as Motion Analyzer software provided by Rockwell Automation of Milwaukee, Wis., may be designed to optimize the selection of the add-on capacitive modules 14.

Figure 4:
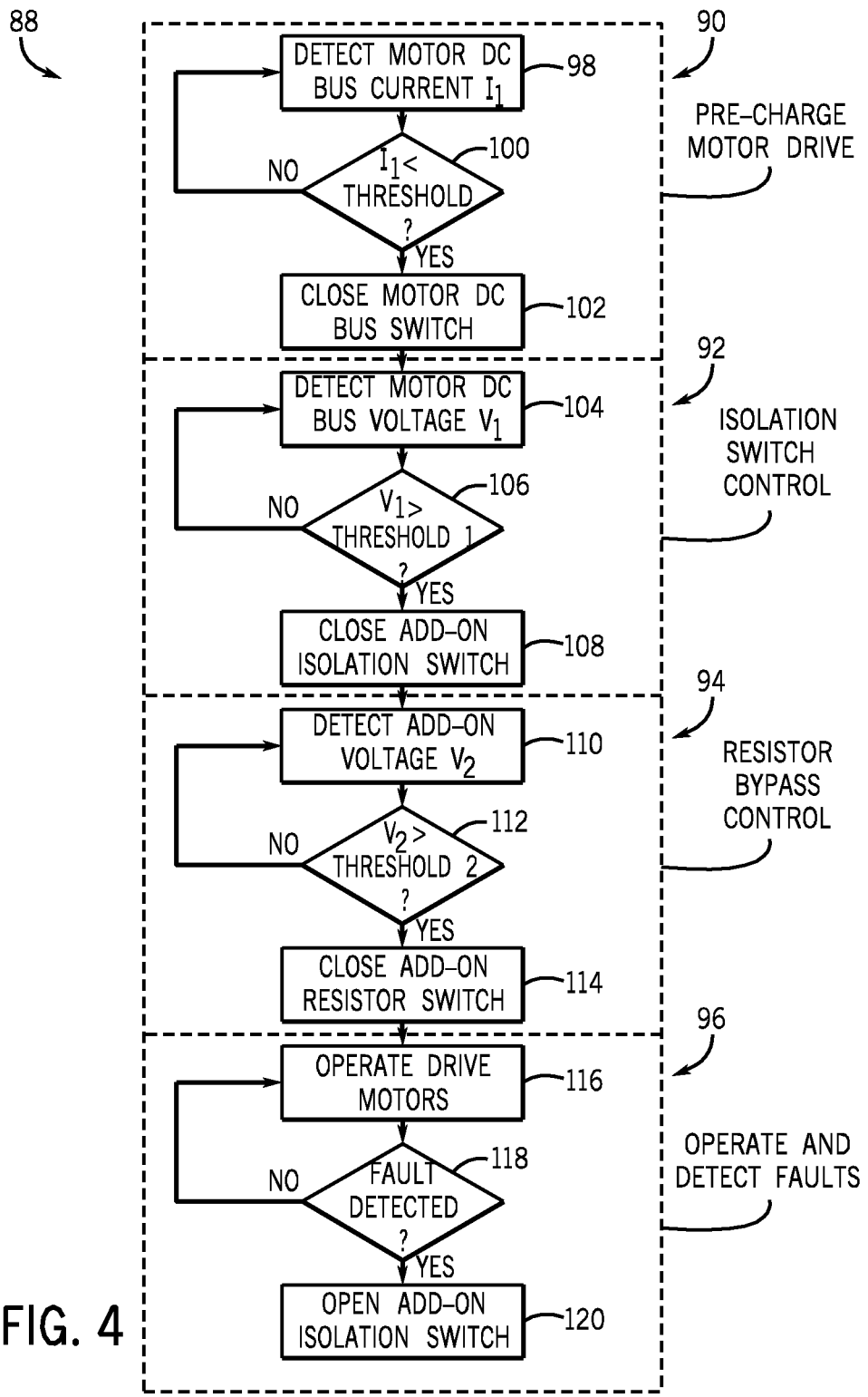
FIG. 4 is a flowchart of an embodiment of a method to pre-charge a motor drive and an add-on capacitive module in accordance with aspects of the present techniques.

FIG. 4 is a flowchart of an embodiment of a method 88 for pre-charging the motor drive system 10. In general, the method includes pre-charging (block 90) the motor drive 12, pre-charging (block 92) the add-on capacitive module through the pre-charge resistor 60, pre-charging (block 94) the add-on capacitive module through resistor bypass switch 62, and operating and detecting (block 96) fault conditions.

In pre-charging (block 90) the motor drive 12, the control circuitry 38 may implement a control algorithm to reduce in-rush current, as discuss previously. For example, the current sensor 42 may detect (block 98) a current $I_1$ flowing through a resistor of the pre-charge circuitry 20. The control circuitry 38 may then determine (decision 100) if the current $I_1$ is below a predetermined threshold current. If the current $I_1$ is below the threshold current, the control circuitry 38 may close (block 102) a bypass switch of the pre-charge circuitry 20, enabling the current to bypass the resistor. In certain embodiments, the control circuitry 38 may automatically close (block 102) the bypass switch after a time delay. The time delay may be measured from when the current $I_1$ is initially detected (block 98), when the current $I_1$ is determined (decision 100) to be less than the threshold current, or a combination thereof.

A similar control algorithm may be implemented to pre-charge (block 92) the add-on capacitive module 14 through the pre-charge resistor 60. The input voltage sensing circuit 66 may detect (block 104) the voltage $V_1$. As noted above, the voltage $V_1$ is indicative of a state-of-charge of the motor drive 12. The control circuitry 70 may determine (decision 106) if the voltage $V_1$ is above a predetermined threshold voltage (e.g., if the motor drive 12 is sufficiently pre-charged). If the voltage $V_1$ is above the threshold voltage, the control circuitry 70 may close (block 108) the isolation switch 56 to pre-charge the add-on capacitive module 14. In certain embodiments, the control circuitry 70 may automatically close (block 108) the isolation switch 56 after a time delay. The time delay may be measured from when the voltage $V_1$ is initially detected (block 104), when the voltage $V_1$ is determined (decision 106) to be greater than the threshold voltage, or a combination thereof.

To pre-charge (block 94) the add-on capacitive module through the bypass switch 62, the module voltage sensing circuit 68 may detect (block 110) the voltage $V_2$. As noted above, the voltage $V_2$ is indicative of a state-of-charge of the add-on capacitive module 14. The control circuitry 70 may determine (decision 112) if the voltage $V_2$ is above another predetermined threshold voltage (e.g., if the add-on capacitive module 14 is sufficiently pre-charged). If the voltage $V_2$ is above the threshold voltage, the control circuitry 70 may close (block 114) the resistor bypass switch 62 to pre-charge the add-on capacitive module 14. In certain embodiments, the control circuitry 70 may automatically close (block 114) the resistor bypass switch 62 after a time delay. The time delay may be measured from when the voltage $V_2$ is initially detected (block 110), when the voltage $V_2$ is determined (decision 112) to be greater than the threshold voltage, or a combination thereof. Moreover, in a presently contemplated embodiment, closing (block 114) the resistor bypass switch 62 may be based on a difference between the voltage $V_1$ (i.e. motor drive pre-charge voltage) and the voltage $V_2$ (i.e. add-on module pre-charge voltage). For example, when the voltage difference between $V_1$ and $V_2$ is less than a threshold, the control circuitry may close (block 114) the resistor bypass switch 62 to encourage a free flow of power to the add-on capacitive module 14.

A user may operate (block 116) the drive motors 12. The control circuitry 70 may determine (decision 118) if a fault condition has occurred. As discussed previously, the fault condition may include an over-temperature, an over-voltage, an open fuse, a voltage sense imbalance, another pre-charge fault, or a combination thereof. In response to a fault condition, the control circuitry 70 may open (block 120) the isolation switch 56 to isolate the add-on capacitive module 14 from the motor drive system 10.

It is to be noted that the order of closing (blocks 102, 108, 114) the respective switches may vary among implementations, as will be described further in FIGS. 5 and 6. In addition, determining (decision 118) when a fault has occurred may be performed at predetermined time intervals, such as while pre-charging (block 90) the motor drive 12, pre-charging the add-on capacitive module 14 (blocks 92, 94), operating (block 116) the motor drive system 10, or a combination thereof. Accordingly, the time intervals during which fault detection occurs may also be implementation-specific.

Figure 5:
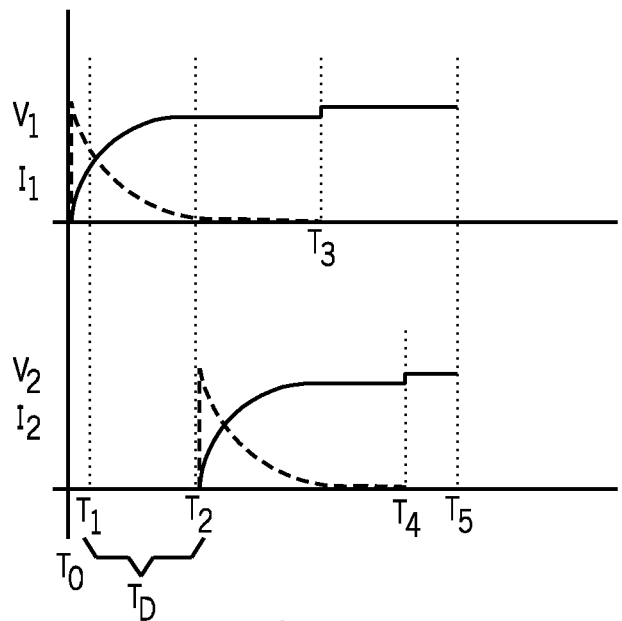
FIG. 5 is a graphical illustration of a timing diagram, illustrating the voltage and current of the motor drive system and add-on capacitive module.

FIG. 5 illustrates a timing diagram for pre-charging the motor drive system 10. At time $T_0$, 3-phase power is applied to the rectifier 18. The voltage $V_1$, as illustrated by the solid line, begins to increase, indicating that the capacitive circuitry 26 of the motor drive 12 is charging. Additionally, the current $I_1$ (i.e., motor drive pre-charge current), as shown by the dashed line, increases rapidly (e.g., in-rush current) and begins to decrease. At time $T_1$, the voltage $V_1$ surpasses the threshold voltage, and the control circuitry 70 begins a timer. After a time delay $T_D$, at time $T_2$, the control circuitry 70 closes the isolation switch 56, thereby initiating the pre-charging of the add-on capacitive module 14. The voltage $V_2$, as illustrated by the solid line, begins to increase, indicating that the capacitive circuit 64 of the add-on module 14 is charging. Additionally, a current $I_2$ (i.e., add-on module pre-charge current), which is shown as the dashed line and is indicative of a current flowing through the pre-charge resistor 60, increases rapidly (e.g., in-rush current) and begins to decrease. At time $T_3$, the drive control circuitry 38 closes the switch of the pre-charge circuit 20. As a result, $V_1$ increases slightly and $I_1$ decreases to approximately zero, due to $I_1$ bypassing the resistor. Similarly, at time $T_4$, the control circuitry 70 closes the resistor bypass switch 62. As a result, $V_2$ increases slightly and $I_2$ decreases to approximately zero due to $I_2$ bypassing the pre-charge resistor 60. As illustrated, the switch of the pre-charge circuit 20 ($T_3$) is closed well before the resistor bypass switch 62 is closed ($T_4$). Time $T_5$ generally indicates a completion of pre-charging the motor drive system 10. As noted above and as shown in FIG. 6, the timing may vary among embodiments.

Figure 6:
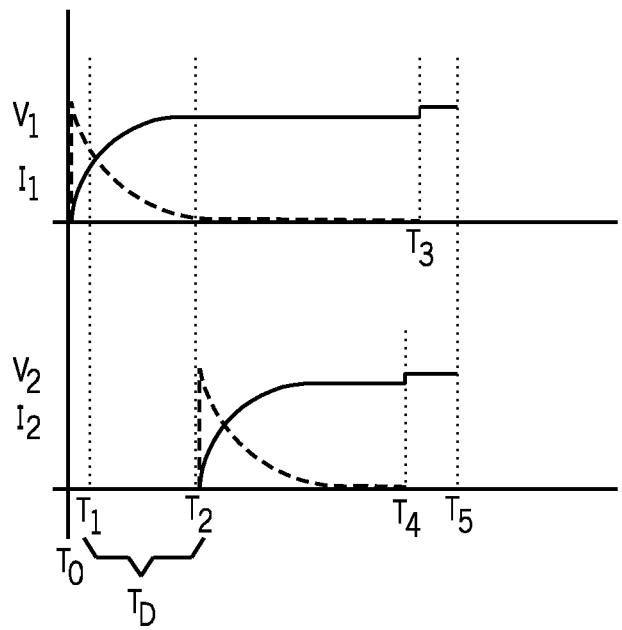
FIG. 6 is a graphical illustration of another timing diagram, illustrating the voltage and current of the motor drive system and add-on capacitive module.

FIG. 6 is another timing diagram for pre-charging the motor drive system 10. The timing diagram of FIG. 6 is similar to the timing diagram of FIG. 5, with the exception that the events of $T_3$ and $T_4$ occur at approximately the same time. Closing both bypass switches simultaneously may allow both the drive motor 12 and the add-on capacitive module 14 to reach a steady-state at approximately the same time. In certain embodiments, the switch of the pre-charge circuit 20 may be closed after the resistor bypass switch 62 is closed. That is, $T_4$ may occur prior to $T_3$.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An add-on motor drive capacitive module comprising:
   a module DC bus configured to be coupled to a motor DC bus of one or more motor drives;
   a capacitive circuit across first and second legs of the DC bus and configured to store energy when pre-charged;
   a first switch coupled in the first leg of the DC bus;
   an input voltage sensing circuit;
   a module voltage sensing circuit;
   a pre-charge resistor in the first leg of the DC bus;
   a second switch in parallel with the pre-charge resistor and in series with the first switch; and
   control circuitry coupled to the voltage sensing circuits and to the first and second switches, and configured to close the first switch based upon a charge state of the one or more motor drives, and to close the second switch based upon a charge state of the capacitive circuit;
   wherein the first switch is disposed between the motor DC bus and the second switch.

2. The module of claim 1, wherein the charge state of the one or more motor drives is indicated by a voltage reading from the input voltage sensing circuit.

3. The module of claim 1, wherein the charge state of the capacitive circuit is indicated by a voltage reading from the module voltage sensing circuit.

4. The module of claim 1, wherein the first and/or the second switch comprises a solid state switch.

5. The module of claim 1, wherein the first and/or the second switch comprises an electromechanical switch.

6. The module of claim 1, wherein the control circuitry comprises a processing circuit and a driver circuit.

7. The module of claim 1, wherein the control circuitry is configured to open the first switch in the event of a fault condition.

8. A motor drive system comprising:
   a motor drive comprising a rectifier circuit, an inverter circuit, and a motor DC bus coupled between the rectifier circuit and the inverter circuit, a motor drive capacitive circuit coupled across the motor DC bus, and a motor drive pre-charge circuit to the motor drive capacitive circuit and configured to control charging of the motor drive capacitive circuit; and
   an add-on capacitive module comprising a module DC bus configured to be coupled to the motor DC bus, a capacitive circuit across of the module DC bus and configured to store energy when pre-charged, an input voltage sensing circuit, a module voltage sensing circuit, a pre-charge resistor coupled to a first leg of the DC bus, a first switch in the first leg of the DC bus, a second switch in parallel with the pre-charge resistor and in series with the first switch, and control circuitry coupled to the voltage sensing circuits and to the first and second switches, and configured to close the first switch based upon a charge state of the motor drive, and to close the first switch based upon a change state of the capacitive circuit.

9. The system of claim 8, comprising a plurality of motor drives coupled to the motor DC bus.

10. The system of claim 8, wherein the plurality of motor drives receives input AC power from common inputs.

11. The system of claim 8, comprising a plurality of add-on capacitive modules coupled in parallel to the motor DC bus.

12. The system of claim 8, wherein a capacitance of the add-on capacitive module is based on a size of the motor drive.

13. A method for pre-charging a motor drive system, comprising:
    pre-charging a motor drive through a motor DC bus;
    pre-charging an add-on capacitive module through a resistor after a time delay;
    pre-charging the add-on capacitive module and bypassing the resistor;
    detecting a fault condition; and
    disconnecting the add-on capacitive module from the motor DC bus when the fault condition has been detected;
    wherein pre-charging the motor drive comprises:
    detecting a current of the motor DC bus;
    determining if the current is less than a threshold current and
    closing a switch of the motor DC bus when the current is less than the threshold current.

14. A method for pre-charging a motor drive system, comprising:
    pre-charging a motor drive through a motor DC bus;
    pre-charging an add-on capacitive module through a resistor after a time delay;
    pre-charging the add-on capacitive module and bypassing the resistor;

detecting a fault condition; and
disconnecting the add-on capacitive module from the motor DC bus when the fault condition has been detected;
wherein pre-charging the add-on capacitive module through the resistor comprises:
detecting a voltage of the motor DC bus;
determining if the voltage is greater than a threshold voltage;
starting a timer when the voltage is greater than the threshold voltage; and
closing an isolation switch of the add-on capacitive module after the time delay, wherein the time delay is based on the timer.

15. A method for pre-charging a motor drive system, comprising:
pre-charging a motor drive through a motor DC bus;
pre-charging an add-on capacitive module through a resistor after a time delay;
pre-charging the add-on capacitive module and bypassing the resistor;
detecting a fault condition; and
disconnecting the add-on capacitive module from the motor DC bus when the fault condition has been detected;
wherein pre-charging the add-on capacitive module and bypassing the resistor comprises:
detecting a voltage of the add-on capacitive module;
determining if the voltage is greater than a threshold voltage; and
closing a bypass switch of the add-on capacitive module when the voltage is greater than the threshold voltage to bypass the resistor.

16. A method for pre-charging a motor drive system, comprising:
pre-charging a motor drive through a motor DC bus;
pre-charging an add-on capacitive module through a resistor after a time delay;
pre-charging the add-on capacitive module and bypassing the resistor;
detecting a fault condition; and
disconnecting the add-on capacitive module from the motor DC bus when the fault condition has been detected;
wherein disconnecting the add-on capacitive module from the motor DC bus comprises opening an isolation switch of the add-on capacitive module when the fault condition has been detected.

17. The method of claim 16, wherein the fault condition comprises an over-temperature, an over-voltage, an open fuse, a voltage sense imbalance, a pre-charge fault, or a combination thereof.

18. A method for pre-charging a motor drive system, comprising:
pre-charging a motor drive through a motor DC bus;
pre-charging an add-on capacitive module through a resistor after a time delay;
pre-charging the add-on capacitive module and bypassing the resistor;
detecting a fault condition; and
disconnecting the add-on capacitive module from the motor DC bus when the fault condition has been detected; and
comprising detecting the fault condition while pre-charging the motor drive, pre-charging the add-on capacitive module, operating the motor drive system, or a combination thereof.

* * * * *